(12) United States Patent
Wilson

(10) Patent No.: US 7,670,200 B2
(45) Date of Patent: Mar. 2, 2010

(54) TRACKED AMPHIBIOUS VEHICLE AND ADAPTABLE AMPHIBIOUS PONTOON TRACKING SYSTEM

(76) Inventor: Paul Wilson, 1131 Chipley St., Westwego, LA (US) 70094

( * ) Notice: Subject to any disclaimer, the term of this patent is extended or adjusted under 35 U.S.C. 154(b) by 0 days.

(21) Appl. No.: 12/021,748

(22) Filed: Jan. 29, 2008

(65) Prior Publication Data
US 2008/0268728 A1 Oct. 30, 2008

Related U.S. Application Data

(60) Provisional application No. 60/887,064, filed on Jan. 29, 2007.

(51) Int. Cl.
*B63H 19/08* (2006.01)
*B60F 3/00* (2006.01)
(52) U.S. Cl. .................. 440/12.63; 440/12.5; 440/12.64
(58) Field of Classification Search ................ 440/12.5, 440/12.63, 12.64
See application file for complete search history.

(56) References Cited

U.S. PATENT DOCUMENTS

| | | | |
|---|---|---|---|
| 3,108,564 A * | 10/1963 | Prosser | 440/12.63 |
| 3,385,255 A * | 5/1968 | Willard et al. | 440/12.56 |
| 3,760,763 A * | 9/1973 | Brusacoram | 440/12.64 |
| 3,976,025 A | 8/1976 | Russell | |
| 4,433,634 A * | 2/1984 | Coast | 440/12.64 |
| 4,671,774 A * | 6/1987 | Owsen | 440/95 |
| 4,744,324 A | 5/1988 | Martinmaas | |
| 4,961,395 A * | 10/1990 | Coast | 440/12.64 |
| 7,131,507 B2 * | 11/2006 | Wenger et al. | 180/6.7 |

FOREIGN PATENT DOCUMENTS

JP 53075619 A2 7/1976
KR 20-1990-001658 Y1 3/1990

OTHER PUBLICATIONS

International Search Report and Written Opinion for PCT/US2008/052317; dated Jun. 27, 2008 (11 pages).

* cited by examiner

*Primary Examiner*—Daniel V Venne
(74) *Attorney, Agent, or Firm*—Conley Rose, P.C.

(57) ABSTRACT

An amphibious vehicle operable on dry land, wet land, or marsh land covered by water. In some embodiments, the amphibious vehicle includes a land-based vehicle, such as a car, truck, or all terrain vehicle (ATV), at least two pontoons supporting the land-based vehicle, and a track system disposed around each of the pontoons. Each pontoon has an internal volume configured to provide buoyancy for the land-based vehicle, whether on wet land or in water. The track system is adapted to propel the land-based vehicle. The amphibious vehicle may further include a drive system coupled between the land-based vehicle and the track system and a skid steering system. The drive system is configured to selectably rotate the track system about the pontoons, while the skid steering system is configured to control the direction in which the land-based vehicle is propelled. The amphibious vehicle may also include a suspension system.

18 Claims, 5 Drawing Sheets

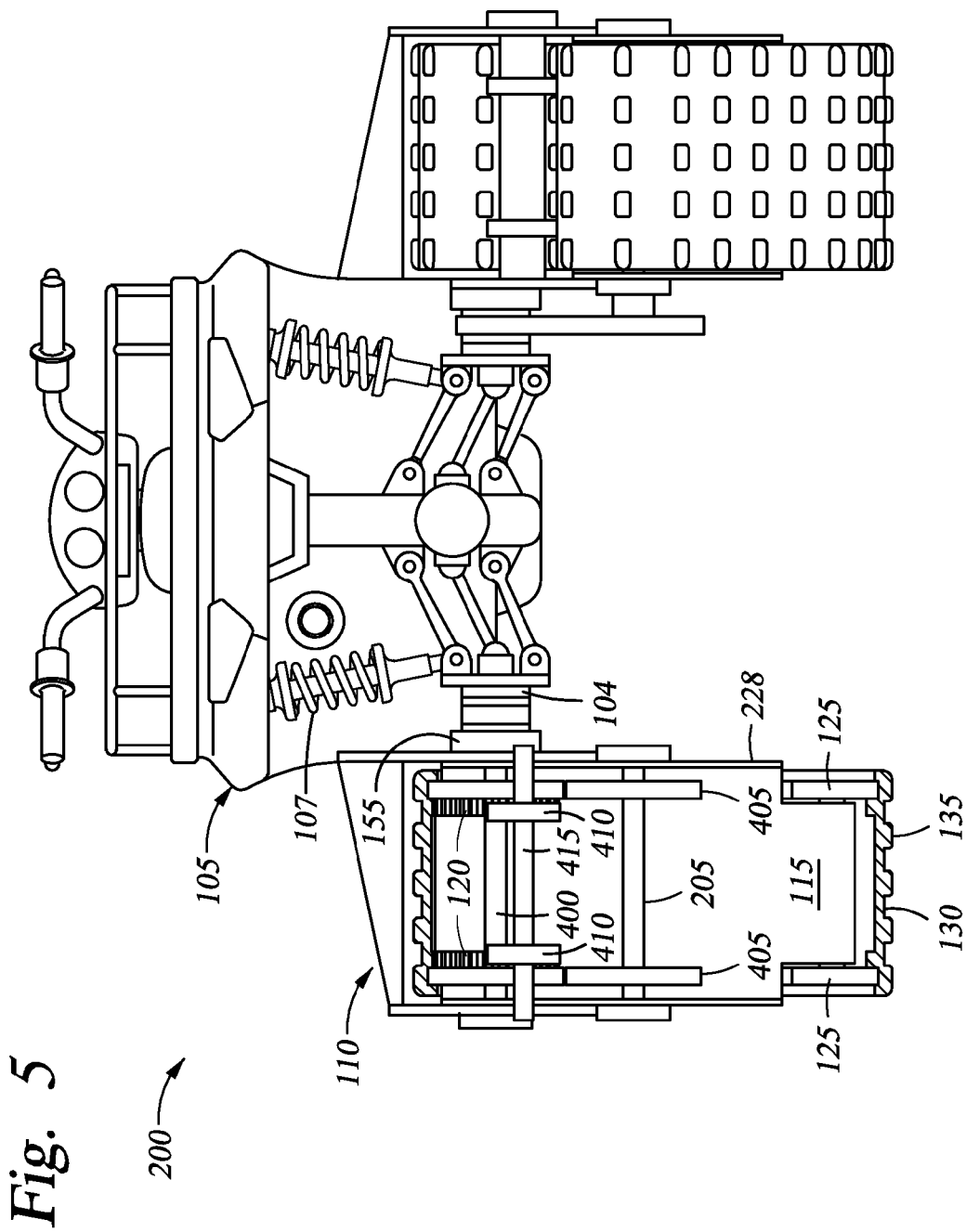

TRACKED AMPHIBIOUS VEHICLE AND ADAPTABLE AMPHIBIOUS PONTOON TRACKING SYSTEM

CROSS-REFERENCE TO RELATED APPLICATIONS

This application claims benefit of U.S. provisional application Ser. No. 60/887,064 filed Jan. 29, 2007, and entitled "Tracked Amphibious Vehicle and Adaptable Amphibious Tracking System," which is hereby incorporated herein by reference in its entirety for all purposes.

STATEMENT REGARDING FEDERALLY SPONSORED RESEARCH OR DEVELOPMENT

Not applicable.

BACKGROUND

1. Field of the Invention

Embodiments of the invention relate generally to amphibious vehicles and, more particularly, to land-based vehicles adapted for amphibious use. Still more particularly, embodiments of the invention relate to a tracking system for adapting a land-based vehicle for use in marshy or swampy terrain.

2. Description of Related Art

Amphibious vehicles, known as marsh buggies, were first developed to support oil and gas exploration operations conducted in marshy or swampy terrain. Since their development, there has been growing concern in regards to the environmental impact of operations in marshlands, wetlands, and other low-lying areas due, at least in part, to the deterioration of many marshland and wetland areas. In response, significant efforts are being made to preserve, protect and restore these areas. Marsh buggies are currently being used to assist in these restoration and preservation efforts.

Marsh buggies typically include a pair of pontoons connected to a center platform. The pontoons are usually surrounded by a cleated track system that is capable of engaging ground or swamp land to propel the vehicle. The track system uses one or more endless chains surrounding the periphery of each pontoon. The endless chains, supporting the cleated tracks, are driven about the periphery of the pontoons, by a sprocket or other means, in order to provide propulsion to the vehicle. By varying the track speed around each pontoon, the vehicle can be advanced, turned, or reversed.

Due to their cleated track system, marsh buggies are ideal for operation in wetlands, marshlands, and other low-lying areas. Moreover, many have been adapted to haul personnel and cargo as well as serve as the operating platform for various types of equipment, such as excavators, draglines, and backhoes. Typically, the top several inches of the ground in wetlands, marshlands, and other low-lying areas are mud or soft terrain that cannot support weight. However, beneath the mud or soft terrain, there is solid ground that can support weight. During operation of a marsh buggy, the cleated tracks surrounding each pontoon sink into the soft terrain, or mud, until the tracks contact the solid ground beneath. Contact between the cleated tracks and the solid ground provides traction for the marsh buggy, allowing the marsh buggy to maneuver through the mud or soft terrain.

Additionally, marsh buggies are often capable of floating in order to navigate small bodies of water due to the buoyancy provided by their pontoons. However, these vehicles are not designed to operate while floating. Thus, marsh buggies are limited to performing earth-moving operations on dry land or in water where their pontoons remain in contact with the ground.

Most conventional marsh buggies and amphibious vehicles are manufactured and sold as "turnkey" vehicles. In other words, such marsh buggies are each sold as one complete, integral vehicle including the pontoons, cleated tracks, drive train, chassis, engine, platform or cabin, etc. Consequently, such conventional marsh buggies tend to be relatively expensive and intended for a single purpose—swamp and wetland traversal. In addition, many conventional marsh buggies are designed for construction and/or excavation activities in marsh or wetlands, and thus, are typically relatively large and robust. As a result, these conventional amphibious vehicles typically have a large footprint, which may be of concern in environmentally sensitive areas. Further, the overall size of such conventional amphibious vehicles may restrict and/or limit their use in narrow passages and/or close-quarters projects.

Accordingly, there remains a need for an amphibious vehicle capable of accessing and/or navigating through tight passages, while having a footprint that lessens or minimizes the impact of the vehicle on the environment. Therefore, embodiments of the invention are directed to an amphibious vehicle that satisfies this need and seeks to overcome limitations of the prior art.

SUMMARY OF THE PREFERRED EMBODIMENTS

An amphibious vehicle for use on dry land and in swampy or wet terrain are disclosed. In some embodiments, the amphibious vehicle includes a land-based vehicle, at least two pontoons supporting the land-based vehicle, and a track system disposed on each of the pontoons. Each pontoon has an internal volume configured to provide buoyancy to the land-based vehicle, while the track system is adapted to propel the land-based vehicle.

An amphibious tracking system for converting a land-based vehicle to an amphibious vehicle is also disclosed. In some embodiments, the amphibious tracking system includes at least two pontoons, each pontoon having an internal volume configured to provide buoyancy for the land-based vehicle, a track system disposed on each pontoon and adapted to propel the land-based vehicle, a drive system configured to couple between the land-based vehicle and the track system and to selectably rotate the track system about the pontoons, and a skid steering system configured to control the direction in which the land-based vehicle is propelled.

Thus, embodiments of the invention comprise a combination of features and advantages that enable substantial enhancement of amphibious vehicles. These and various other characteristics and advantages of the invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein:

FIG. 5 is a partial cross-sectional rear view of the amphibious vehicle of FIG. 4.

DETAILED DESCRIPTION OF THE PREFERRED EMBODIMENTS

Certain terms are used throughout the following description and claims to refer to particular system components. This document does not intend to distinguish between components that differ in name but not function. Moreover, the figures are not necessarily to scale. Certain features of the embodiments may be shown exaggerated in scale or in somewhat schematic form, and some details of conventional elements may not be shown in the interest of clarity and conciseness.

In the following discussion and in the claims, the terms "comprises" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

Figure 1:
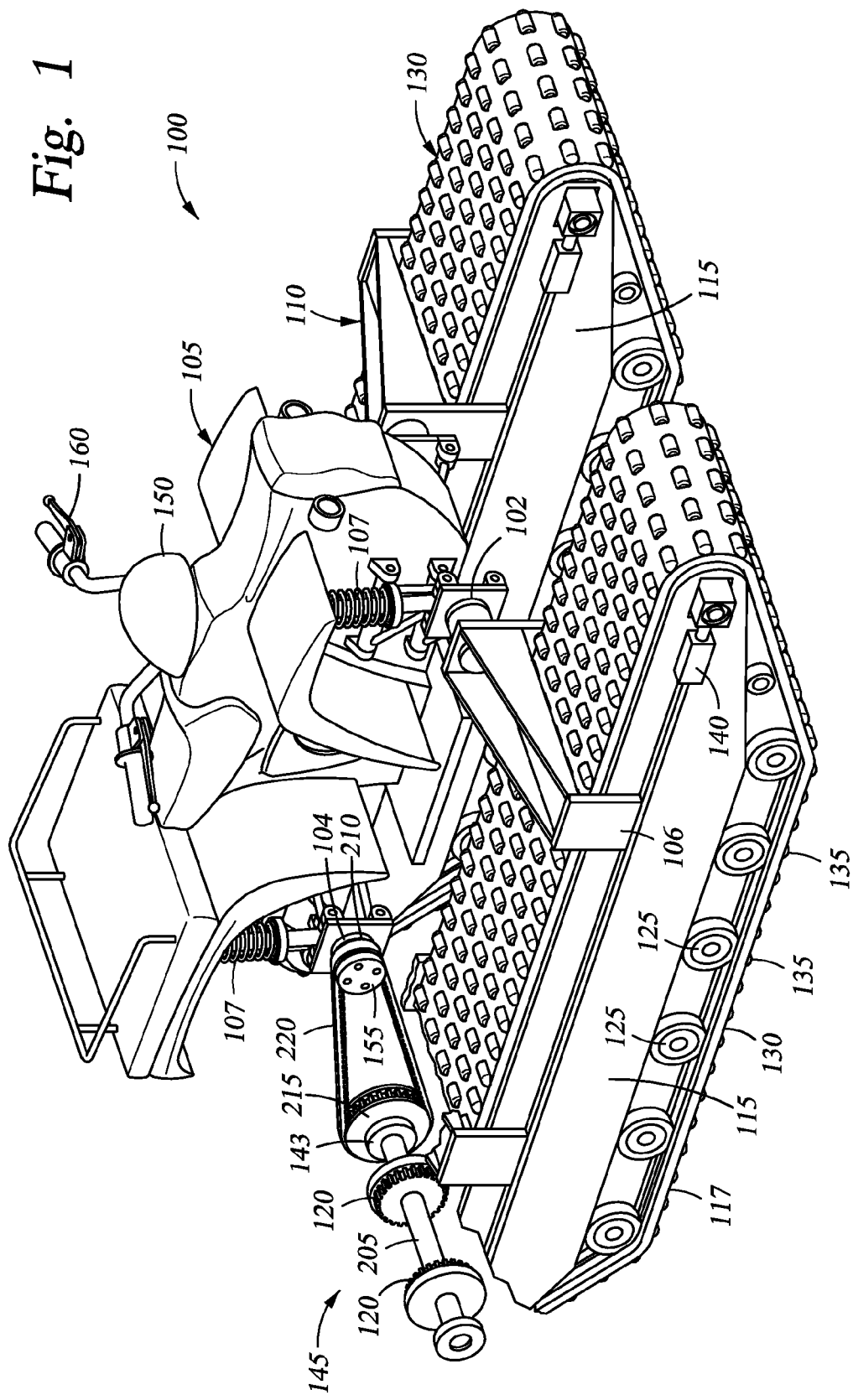
FIG. 1 is a perspective view in partial cross-section of an embodiment of an amphibious vehicle in accordance with embodiments of the invention.

Referring now to FIG. 1, an exemplary embodiment of an amphibious vehicle is shown in partial cross-section, including a land-based vehicle 105 coupled to and supported by an adaptable amphibious tracking system 110. Land-based vehicle 105 is a vehicle manufactured primarily for use over dry land and generally incapable of operating in swampy or wet terrain, such as marshlands, wetlands, or other similar low-lying areas. Also, land-based vehicle 105 includes a suspension system 107. Suspension system 107 can be any type of suspension system used on land-based vehicle 105, including but not limited to springs (e.g., coil or leaf springs), shock absorbers, and/or linkages.

In some embodiments, land-based vehicle 105 is a car, a truck, or an all terrain vehicle (ATV), such as that depicted in FIG. 1.

Coupling an adaptable amphibious tracking system 110 to land-based vehicle 105 yields amphibious vehicle 100, which is operable over dry land and in swampy or wet terrain. Also, adapting an amphibious tracking system 110 to a land-based vehicle 105 having limited size, like an ATV, provides an amphibious vehicle 100 that is suitable for accessing and/or navigating through tight passages, whether over dry land or in swampy terrain. Furthermore, by coupling an adaptable amphibious tracking system 110 to land-based vehicle 105 having suspension system 107, amphibious vehicle 100 has benefit of suspension system 107, thereby providing an operator of amphibious vehicle 100 with a smoother ride as vehicle 100 travels over ground.

Amphibious tracking system 110 includes two pontoons 115. Each pontoon 115 is a rigid, hollow, air-tight structure that supports and stabilizes amphibious vehicle 100 and preferably provides buoyancy or "flotation" for amphibious vehicle 100 in amphibious environments. The footprint 117 of amphibious vehicle 100, defined by the area of pontoons 115 in contact with the ground, is configured to lessen or minimize the pressure exerted by the vehicle 100 on the ground and a function of the total weight of amphibious vehicle 100, including any cargo. Thus, amphibious vehicle 100 is suited for operation in environmentally sensitive areas.

Each pontoon 115 is preferably supported by a plurality of bogie wheels 125 along its base. An endless-chain track 130 having a plurality of cleats 135 surrounds each pontoon 115 and engages two rotatable drive sprockets 120 and the bogie wheels 125 positioned adjacent the base of the pontoon 115. The drive sprockets 120 may be positioned within pontoon 115 at one end, as shown, or positioned external to pontoon 115. Two track adjusters 140 extend within the circumference of each track 130 to control the tautness of the track 130 and ensure that the track 130 remains securely engaged about drive sprockets 120 and bogie wheels 125. For those embodiments of an amphibious vehicle having drive sprockets 120 positioned within pontoons 115, as shown, each track adjuster 140 is coupled between a drive sprocket 120 at one end of a pontoon 115 and a track 130 at the opposite end of the pontoon 115.

To couple land-based vehicle 105 to amphibious tracking system 110, as shown in FIG. 1, the wheels of land-based vehicle 105 are removed to expose front and rear wheel hubs 102, 104, located at the front and rear ends, respectively, of land-based vehicle 105. Preferably, bracket 106 is coupled between each front wheel hub 102 and a pontoon 115 to prevent movement of land-based vehicle 105 relative to amphibious tracking system 110 at this location.

Amphibious tracking system 110 further includes drive system 145 coupled between rear wheel hubs 104 of land-based vehicle 105 and drive sprockets 120 to independently rotate each track 130 about its respective pontoon 115. Like many conventional vehicles, land-based vehicle 105 is configured to selectably rotate rear wheel hubs 104 in a clockwise or counterclockwise direction when its engine is operating. As wheel hubs 104 rotate, and thus drive sprockets 120 and tracks 130 coupled thereto, rotation of bogie wheels 125 further enables rotation of tracks 130 about pontoons 115. When amphibious vehicle 100 is positioned on ground, cleats 135 of tracks 130 provide traction, enabling amphibious vehicle 100 to traverse the ground on which it is positioned. Alternatively, when amphibious vehicle 100 is floating, rotation of tracks 130 propels the vehicle 100 through the water. Thus, land-based vehicle 105 and drive system 145 are configured to propel amphibious vehicle 100 either forward or backward, whether the vehicle 100 is positioned on ground or floating in water.

The manner in which drive system 145 is coupled to drive sprockets 120 may take various forms, some of which will be described. Also, in some embodiments, including those represented by FIG. 1, drive system 145 further includes a reduction drive 143 coupled between land-based vehicle 105 and the drive sprockets 120 residing within each pontoon 115. Reduction drives 143 increase the torque applied to drive sprockets 120, thereby enabling amphibious vehicle 100 to climb steep banks or out of deep canals.

As shown in FIG. 1, amphibious tracking system 110 further includes skid steering system 150 to control the direction in which amphibious vehicle 100 moves and to slow or stop amphibious vehicle 100 with or without a change in direction. Skid steering system 150 includes two brake clutches 155, one each coupled to a rear wheel hub 104, and controls 160 configured to independently operate each brake clutch 155. In at least one embodiment, controls 160 comprise a control for one brake clutch 155 and another control for the other brake clutch 155. Further, in some embodiments, controls 160 comprise two hand-actuated levers, each lever coupled to a different brake clutch and configured to actuate only that brake clutch.

Brake clutches 155 may be electrical, hydraulic or mechanical. Each brake clutch 155, when actuated using controls 160, is configured to slow or cease rotation of the rear wheel hub 104 to which it is coupled but does not affect the rotation of the other rear wheel hub 104. Slowing or ceasing rotation of the rear wheel hub 104 in this manner consequently slows or ceases rotation of the track 130 coupled to the rear wheel hub 104. Release of the actuated brake clutch 155 allows rotation of the rear wheel hub 104, and thus the track 130, to resume.

As drive system 145 propels amphibious vehicle 100 forward or backward on its cleated tracks 130, controls 160 may be actuated as needed or desired to control the direction in which vehicle 100 moves. To control the direction in which amphibious vehicle 100 moves, controls 160 may be actuated to apply one brake clutch 155, for example, and thereby slow or cease rotation of the track 130 coupled to the actuated brake clutch 155. Since the other track 130 continues to rotate unaffected, the direction in which amphibious vehicle 100 moves changes. To move amphibious vehicle 100 in the opposite direction, the actuated brake clutch 155 is released and the other brake clutch 155 is actuated to slow or cease rotation of the other track 130. Furthermore, to slow amphibious vehicle 100 without changing direction or completely stop vehicle 100, controls 160 are actuated to apply both brake clutches 155 equally and simultaneously. Thus, by selectably controlling the forward or backward motion of amphibious vehicle 100 using drive system 145 and selectably applying either or both brake clutches 155 of skid steering system 150, amphibious vehicle 100 may be propelled forward, backward, to the right, to the left, or any combination thereof as well as stopped.

As stated above, the manner in which drive system 145 is coupled to drive sprockets 120 may vary from one embodiment of an amphibious vehicle to the next. FIGS. 2-5 depict two exemplary embodiments of an amphibious vehicle in which drive system 145 is coupled differently between land-based vehicle 105 and drive sprockets 120 of amphibious tracking system 110.

Figure 2:
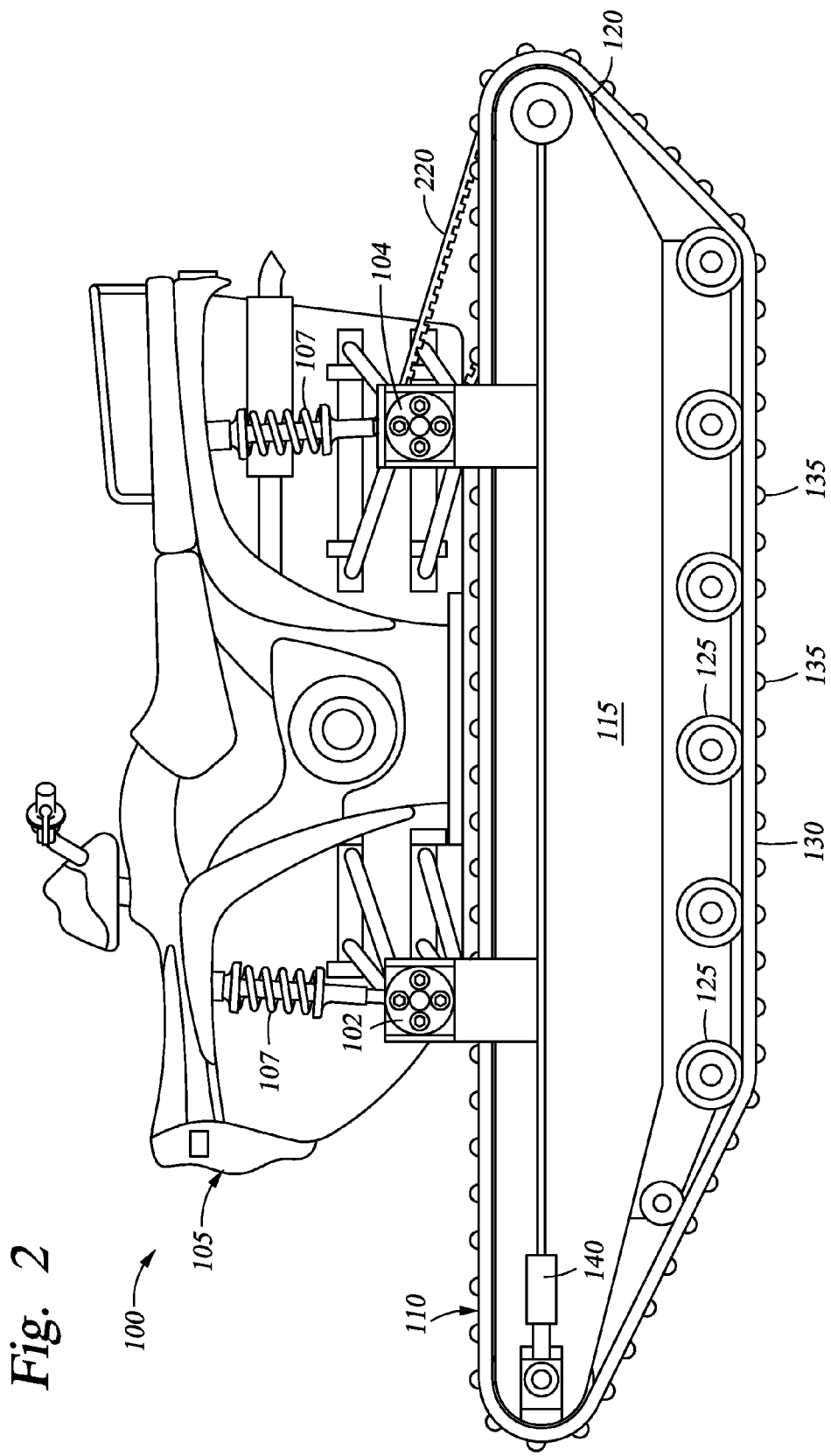
FIG. 2 is a cross-sectional side view of the amphibious vehicle of FIG. 1.
Figure 3:
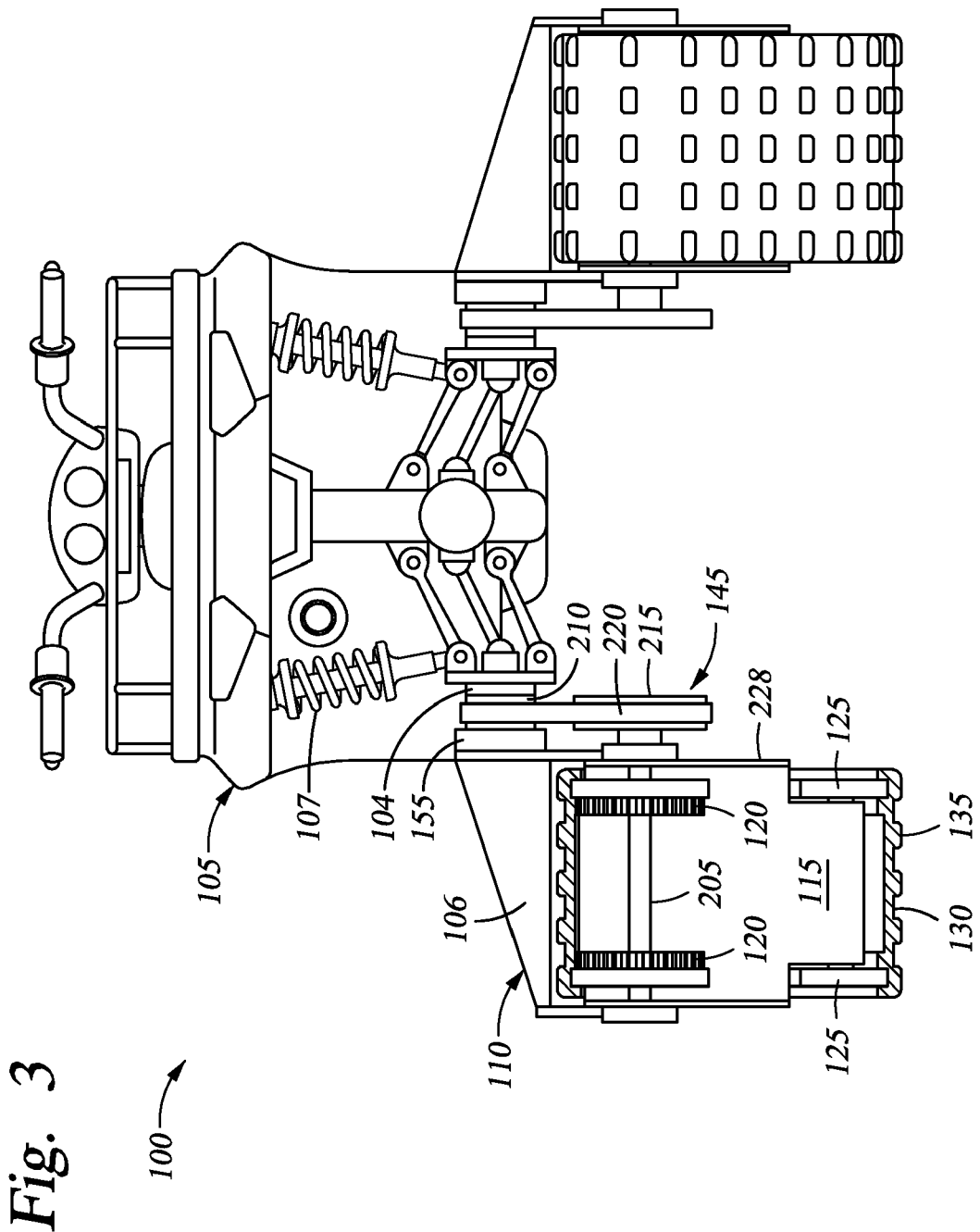
FIG. 3 is a partial cross-sectional rear view of the amphibious vehicle of FIG. 1.

FIGS. 2 and 3 are cross-sectional side and partial cross-sectional rear views, respectively, of amphibious vehicle 100 depicted in FIG. 1. In addition to the description above, the following also applies. As shown in FIGS. 2 and 3, drive sprockets 120 of amphibious tracking system 110 are positioned internal to pontoons 115. Drive system 145 further includes a coupling member 200 between each brake clutch 155 and rear wheel hub 104 and a coupling member 205 between drive sprockets 120 within each pontoon 115. A sprocket 210 is coupled to each coupling member 200 between clutch brake 155 and rear wheel hub 104. Each coupling member 205 extends between drive sprockets 120 and through inner side wall 228 of pontoon 115. A sprocket 215 is coupled to the end of each coupling member 205 extending from the interior of pontoons 115. Sprockets 210, 215 are positioned externally to pontoons 115. A belt 220 surrounds and engages sprockets 210, 215 such that belt 220 extends vertically between sprockets 210, 215 and parallel with the inner side wall 228 of each pontoon 115. When land-based vehicle 100 rotates each rear wheel hub 104, rotary motion is transferred from the rear wheel hub 104 to drive sprockets 120 through coupling member 200, sprocket 210, belt 220, sprocket 215, and coupling member 205, respectively. Therefore, in this embodiment of an amphibious vehicle, the coupling of rear wheel hubs 104 to drive sprockets 120 via drive system 145 is indirect.

Figure 4:
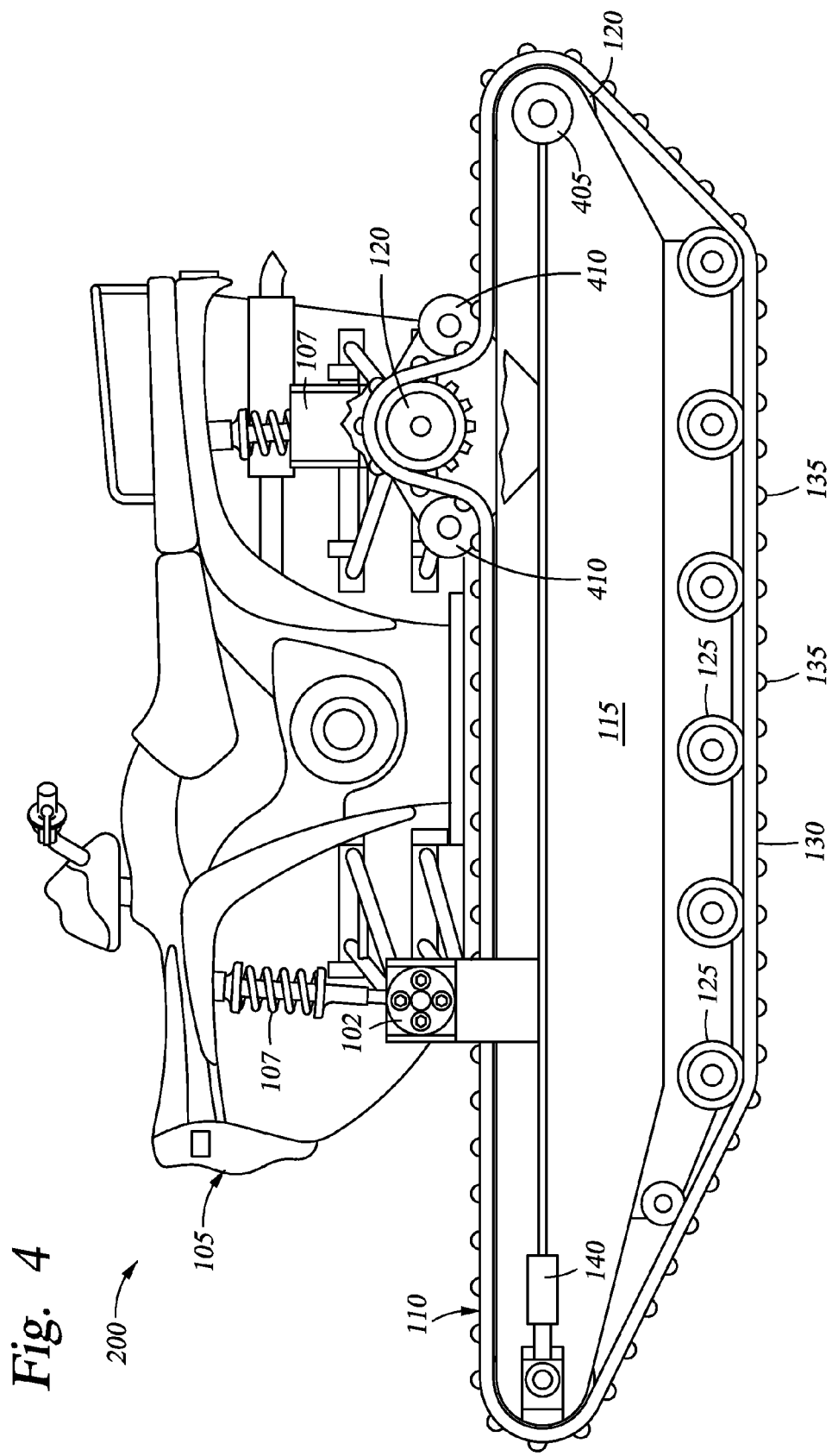
FIG. 4 is a cross-sectional side view of another embodiment of an amphibious vehicle in accordance with embodiments of the invention.

Turning now to FIGS. 4 and 5, another embodiment of an amphibious vehicle is depicted. In this embodiment, only drive system 145 is modified from that included in and described with reference to amphibious vehicle 100 and FIG. 1, while the remaining systems remain substantially the same. Thus, the general description provided above with reference to FIG. 1 also applies to amphibious vehicle 200 depicted in FIGS. 4 and 5 with the following modifications.

Referring to FIGS. 4 and 5, drive sprockets 120 of amphibious tracking system 110 are positioned external to pontoons 115. As best viewed in FIG. 5, a coupling member 400 extends from each rear wheel 104 through proximate brake clutch 155 and inner side wall 228 of pontoon 115 to drive sprockets 120. Thus, in this embodiment of an amphibious vehicle, the rear wheel hubs 104 of land-based vehicle 105 are directly coupled to drive sprockets 120 of amphibious tracking system 110, and, in contrast to the previous embodiment, no additional sprockets and/or belts are needed to transfer rotary motion from rear wheel hubs 104 to drive sprockets 120.

Because drive sprockets 120 are positioned external to pontoons 115, each track adjuster 140 is positioned between a pair of idle wheels 405 that enable engagement of the track adjuster 140 with the surrounding track 130. Similar to bogie wheels 125, idle wheels 405 also enable rotation of track 130 about its respective pontoon 115. Additionally, to promote tautness of each track 130 and engagement of each track 130 with its corresponding drive sprockets 120, two pairs of top bogie wheels 410, each pair coupled by a coupling member 415 extending therebetween, are positioned adjacent drive sprockets 120. Each pair of top bogie wheels 410 is located on opposite sides of drive sprockets 120 and outside of track 130 to maintain track 130 in engagement with drive sprockets 120. Furthermore, each coupling member 415 is coupled to the adjacent pontoon 115 to prevent movement of bogie wheels 410 relative to drive sprockets 120 and tracks 130.

As described, an amphibious vehicle is formed by coupling an amphibious tracking system to a land-based vehicle. The amphibious vehicle may be made capable of accessing and/or navigating through tight passages by controlling the size of the land-based vehicle to which the amphibious tracking system is adapted. Also, the amphibious vehicle is made suitable for operations in environmentally sensitive areas by configuring its footprint to lessen or minimize the impact of the vehicle on the environment. Because the amphibious vehicle is formed by coupling an existing land-based vehicle, such as an ATV, to an amphibious tracking system, the amphibious vehicle has benefit of the suspension system already included in the land-based vehicle and is less expensive to manufacture than a conventional single-purpose, integral amphibious vehicle, like a marsh buggy. Thus, an existing land-based vehicle that is generally limited to operation on dry land and incapable of operating in swampy terrain may be economically modified to provide an amphibious vehicle that is capable of operating over dry land and swampy terrain as needed. Moreover, by de-coupling the amphibious tracking system from the land-based vehicle and restoring the latter to its original configuration, the land-based vehicle may be reconfigured to operate over land as originally designed.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A vehicle operable on dry land, wet land, and water, the vehicle comprising:
   a land-based vehicle;
   at least two pontoons coupled to said land-based vehicle, each pontoon having an internal volume configured to provide buoyancy for said land-based vehicle;
   a track system disposed on each of said at least two pontoons and adapted to propel said land-based vehicle; and
   a skid steering system coupled between said land-based vehicle and said track system and configured to selectably control a direction in which said land-based vehicle is propelled, wherein said skid steering system comprises:
      two brake clutches, each brake clutch coupled between a rear wheel hub of said land-based vehicle and said track system disposed on one of said at least two pontoons; and
      controls configured to independently actuate each brake clutch;
      wherein when actuated by the controls, each brake clutch slows or ceases rotation of said track system coupled thereto.

2. The vehicle of claim 1, wherein said track system is configured to propel the vehicle through water when the vehicle is floating.

3. The vehicle of claim 1, wherein said track system has an outer surface, wherein said outer surface contacts the dry land, the wet land, or the water creating a footprint, and wherein the footprint is configured to lower pressure exerted by the vehicle on the dry land, wet land, or water in contact with said track system than the pressure that would be exerted if the land-based vehicle was not coupled to the at least two pontoons.

4. The vehicle of claim 1, further comprising a drive system coupled between said land-based vehicle and said track system and configured to selectably rotate said track system to propel said land-based vehicle.

5. The vehicle of claim 4, wherein said drive system is further configured to selectably rotate said track system to propel said land-based vehicle in a forward direction or in a backward direction.

6. The vehicle of claim 1, wherein the controls comprise two hand-actuated levers, each lever coupled to a different brake clutch and configured to actuate only that brake clutch.

7. The vehicle of claim 1, wherein each brake clutch is one of a group consisting of a hydraulic brake, a mechanical brake, and an electrical brake.

8. The vehicle of claim 1, further comprising at least two track adjusters, each track adjuster engaging said track system disposed about one of said at least two pontoons and configured to control tautness of said track system.

9. The vehicle of claim 1, wherein said land-based vehicle is one of a group consisting of a car, a truck, and an all terrain vehicle.

10. The vehicle of claim 1, wherein said land-based vehicle comprises a suspension system coupled between said land-based vehicle and said at least two pontoons.

11. An amphibious tracking system for adapting a land-based vehicle to operate in an amphibious environment, the amphibious tracking system comprising:
    at least two pontoons, each pontoon having an internal volume configured to provide buoyancy for the land-based vehicle;
    a track system disposed on each of said at least two pontoons and adapted to propel the land-based vehicle;
    a drive system configured to couple between the land-based vehicle and said track system and to selectably rotate said track system about said at least two pontoons, wherein said drive system comprises:
       a pair of drive sprockets coupled to said track system disposed on each of said at least two pontoons; and
       a coupling member between each of two rear wheel hubs of the land-based vehicle and each pair of drive sprockets, the coupling members configured to transfer rotary motion of the rear wheel hubs to the drive sprocket; and
    a skid steering system configured to control a direction in which the land-based vehicle is propelled.

12. The amphibious tracking system of claim 11, further comprising at least one reduction drive configured to increase torque applied by said drive system to said track system.

13. The amphibious tracking system of claim 11, further comprising two pairs of upper bogie wheels straddling each pair of drive sprockets, the upper bogie wheels configured to maintain tautness of said track system and to enhance engagement of the drive sprockets with said track system.

14. The amphibious tracking system of claim 11, wherein said drive system is further configured to selectably rotate said track system to propel the land-based vehicle in a forward direction or in a backward direction.

15. The amphibious tracking system of claim 11, further comprising a plurality of lower bogie wheels positioned between said track system and each of said at least two pontoons, the plurality of lower bogie wheels configured to promote rotation of said track system about said at least two pontoons.

16. The amphibious tracking system of claim 11, wherein said skid steering system comprises:
    two brake clutches, each brake clutch coupled between a rear wheel hub of said land-based vehicle and said track system disposed on one of said at least two pontoons; and
    controls configured to independently actuate each brake clutch;
    wherein when actuated by the controls, each brake clutch slows or ceases rotation of said track system coupled thereto.

17. The amphibious tracking system of claim 16, wherein the controls comprise two hand-actuated levers, each lever coupled to a different brake clutch and configured to actuate only that brake clutch.

18. The amphibious tracking system of claim 16, wherein each brake clutch is one of a group consisting of a hydraulic brake, a mechanical brake, and an electrical brake.

* * * * *